United States Patent
Messenger et al.

(10) Patent No.: US 8,998,228 B2
(45) Date of Patent: Apr. 7, 2015

(54) STEERING ATTENUATOR ASSEMBLY FOR MOTOR VEHICLE

(71) Applicant: Powers and Sons, LLC., Montpelier, OH (US)

(72) Inventors: Gene J. Messenger, Novi, MI (US); Charles E. Letts, III, Ann Arbor, MI (US); Joseph M. Martin, Ann Arbor, MI (US); Ronald D. North, West Bloomfield, MI (US)

(73) Assignee: Powers and Sons, LLC, Montpelier, OH (US)

( * ) Notice: Subject to any disclaimer, the term of this patent is extended or adjusted under 35 U.S.C. 154(b) by 0 days.

(21) Appl. No.: 13/970,793

(22) Filed: Aug. 20, 2013

(65) Prior Publication Data

US 2014/0291953 A1    Oct. 2, 2014

Related U.S. Application Data

(60) Provisional application No. 61/852,971, filed on Mar. 26, 2013.

(51) Int. Cl.
   *B62D 7/22*    (2006.01)
   *B62D 7/20*    (2006.01)

(52) U.S. Cl.
   CPC  *B62D 7/22* (2013.01); *B62D 7/228* (2013.01); *B62D 7/20* (2013.01); *B62D 7/226* (2013.01)

(58) Field of Classification Search
   CPC ........... B62D 7/20; B62D 7/22; B62D 7/228; B62D 6/04

USPC .......... 280/89, 89.11, 89.12, 93.501, 93.502, 280/93.511, 268; 267/140.11, 140.13, 141

See application file for complete search history.

(56) References Cited

U.S. PATENT DOCUMENTS

| | | | | |
|---|---|---|---|---|
| 1,840,115 | A * | 1/1932 | Lee | 280/93.511 |
| 1,935,521 | A * | 11/1933 | Piotrowski | 280/89.12 |
| 2,049,502 | A * | 8/1936 | Hufferd et al. | 403/138 |
| 2,175,429 | A * | 10/1939 | Chayne | 280/93.511 |
| 2,252,771 | A * | 8/1941 | Katcher | 188/280 |
| 3,009,712 | A * | 11/1961 | Williams | 280/93.511 |
| 3,140,851 | A * | 7/1964 | Bilancia | 248/588 |
| 3,525,533 | A * | 8/1970 | Mazur | 280/93.511 |
| 3,547,460 | A * | 12/1970 | Gottschald | 280/93.511 |
| 3,938,822 | A * | 2/1976 | Guerriero | 280/86.758 |
| 4,697,817 | A * | 10/1987 | Jefferson | 280/89.12 |
| 4,925,165 | A * | 5/1990 | Sketo | 267/221 |
| 5,503,364 | A * | 4/1996 | Enomoto et al. | 251/129.02 |
| 5,835,232 | A * | 11/1998 | Kameyama | 358/296 |
| 6,086,075 | A * | 7/2000 | O'Bryan et al. | 280/89.12 |
| 6,386,311 | B2 * | 5/2002 | Weisgerber | 180/402 |
| 6,641,231 | B2 * | 11/2003 | Kusano et al. | 303/114.1 |
| 7,416,198 | B2 * | 8/2008 | Blaszynski | 280/89.12 |
| 7,547,028 | B1 * | 6/2009 | Blaszynski et al. | 280/93.51 |

(Continued)

*Primary Examiner* — Ruth Ilan
*Assistant Examiner* — Barry Gooden, Jr.
(74) *Attorney, Agent, or Firm* — Shumaker, Loop & Kendrick, LLP

(57) ABSTRACT

A steering attenuator assembly including a first and second sleeves defining axial passages, the second sleeve engaged within the first sleeve and movable relative thereto in an axial direction, and first and second spring members fitted internal to the attenuator, the first spring member arranged to compress under compressive loading of the steering attenuator and the second spring member arranged to compress under tensile loading of the steering attenuator, wherein the attenuator is tunable.

19 Claims, 7 Drawing Sheets

(56) References Cited

U.S. PATENT DOCUMENTS

| | | | |
|---|---|---|---|
| 7,789,404 B2 * | 9/2010 | Rummel | 280/89.13 |
| 8,544,862 B2 * | 10/2013 | Tsukasaki | 280/89 |
| 8,628,100 B2 * | 1/2014 | Buttner et al. | 280/89 |
| 8,696,232 B2 * | 4/2014 | Sokolihs | 403/315 |
| 8,702,112 B1 * | 4/2014 | Belleau | 280/93.51 |
| 8,714,571 B2 * | 5/2014 | Nataraj et al. | 280/124.107 |
| 8,770,602 B1 * | 7/2014 | Belleau | 280/93.51 |
| 8,839,900 B2 * | 9/2014 | Kim | 180/312 |
| 2002/0130478 A1 * | 9/2002 | Paduano et al. | 280/93.511 |
| 2003/0020328 A1 * | 1/2003 | Kusano et al. | 303/114.1 |
| 2006/0232036 A1 * | 10/2006 | Blaszynski | 280/93.507 |
| 2009/0236812 A1 * | 9/2009 | Mahlmann et al. | 280/93.502 |
| 2011/0233886 A1 * | 9/2011 | Tsukasaki | 280/93.51 |

\* cited by examiner

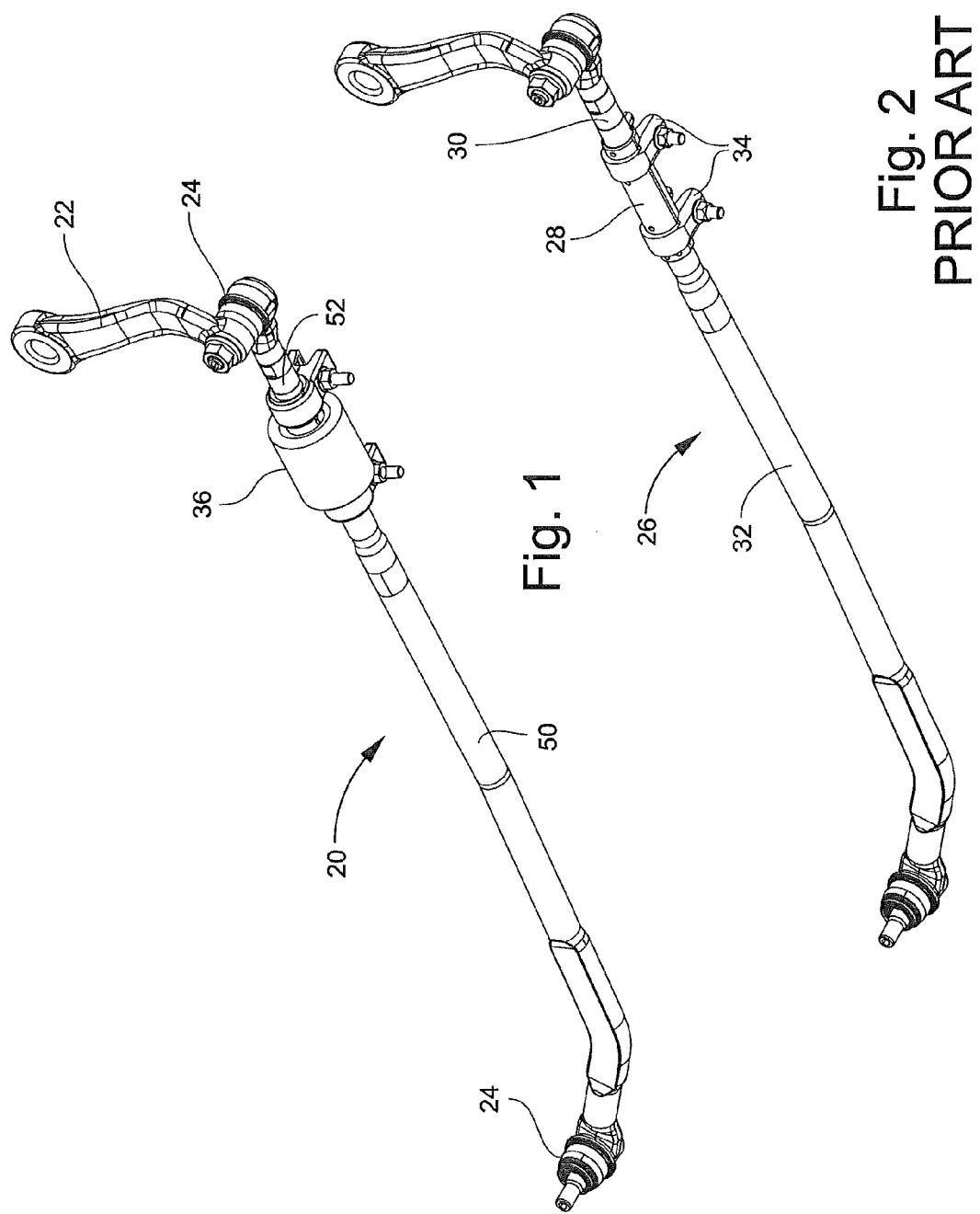

STEERING ATTENUATOR ASSEMBLY FOR MOTOR VEHICLE

CROSS-REFERENCE TO RELATED APPLICATION

This application claims priority to U.S. Provisional Application No. 61/852,971 filed Mar. 26, 2013, the contents of which are incorporated by reference herein.

TECHNICAL FIELD AND BACKGROUND OF THE INVENTION

The present invention relates generally to a damper for use in the steering linkage of a motor vehicle, and more particularly, to a steering attenuator positioned in series between the steering pitman arm and the road wheels such that the direct path between the road wheels and the frame is attenuated both for noise and harshness. The isolated link further allows the steering response to be tuned.

Suspension links are typically isolated in bushings or other input dampening materials. The steering linkage, however, does not have any series dampening of input forces between the road wheels and the steering wheel, thus allowing undamped force signals to transmit through the tie rod ball joints directly through the pitman arm. From there, the undamped force signals pass through the steering gear and into the frame.

Conventional applications utilize an external damper between the frame and the drag link or tie rod. This series damper mitigates, but does not eliminate the direct path between the road wheels and the frame. This condition disadvantageously results in ride harshness due to the unfiltered force path between the road wheels and the frame, direct noise transmission, and an unmatched frequency response between steering inputs and suspension action.

Accordingly, there remains a need for better isolating the steering linkage from impact forces.

BRIEF SUMMARY OF THE INVENTION

In a first embodiment, provided herein is a steering attenuator assembly including a first sleeve defining an axial passage, a second sleeve defining an axial passage, the second sleeve engaged within the first sleeve and movable relative thereto in an axial direction, and first and second spring members fitted internal to the steering attenuator assembly, the first spring member arranged to compress under compressive loading of the steering attenuator assembly and the second spring member arranged to compress under tensile loading of the steering attenuator assembly.

In a further embodiment, the first and second sleeves may be axially aligned, the first spring member may be captured between a first end of the first sleeve and a first end of the second sleeve, and the second spring member may be captured between a second end of the first sleeve and a second end of the second sleeve.

In a further embodiment, the second sleeve may have a lesser diameter and length than the first sleeve such that the second sleeve is received within the first sleeve and movable relative thereto in the axial direction.

In a further embodiment, each of the first and second sleeves may be configured to receive and retain a drag link member therein.

In a further embodiment, one end of each of the first and second sleeves may be configured to radially compress around a drag link member received therein to prevent relative movement therebetween.

In a further embodiment, the steering attenuator assembly may include first and second clamps positioned at opposing ends of the steering attenuator assembly configured to be tightened to radially compress the opposing ends of the steering attenuator assembly to retain drag link members engaged therein.

In a further embodiment, the first and second spring members may be compression springs having the same spring rate.

In a further embodiment, the first and second spring members may be compression springs having different spring rates.

In a further embodiment, the first and second spring members may be elastomeric members having the same spring rate.

In a further embodiment, the first and second spring members may be elastomeric members having different spring rates.

In another embodiment, provided herein is a steering attenuator assembly including a first sleeve defining an axial passage therethrough, a second sleeve defining an axial passage therethrough, the second sleeve engaged within the first sleeve and movable relative thereto in an axial direction, a first spring member located internal to the steering attenuator assembly and captured between a first end of the first sleeve and a first end of the second sleeve configured to compress under compressive loading of the steering attenuator, and a second spring member located internal to the steering attenuator assembly and captured between a second end of the first sleeve and a second end of the second sleeve configured to compress under tensile loading of the steering attenuator.

In a further embodiment, the first and second sleeves may be configured to receive and retain drag link members therein.

In yet another embodiment, provided herein is a drag link assembly for motor vehicle steering linkage and including a first drag link member configured for attachment to a tie rod by way of a ball joint, a second drag link member attached to a pitman arm by way of a ball joint, and a steering attenuator assembly connected in series between the first and second drag link members. The steering attenuator assembly includes a first sleeve defining an axial passage therethrough, a second sleeve defining an axial passage therethrough, the second sleeve engaged within the first sleeve and movable relative thereto in an axial direction, a first spring member captured between a first end of the first sleeve and a first end of the second sleeve configured to compress under compressive loading of the steering attenuator, and a second spring member captured between a second end of the first sleeve and a second end of the second sleeve configured to compress under tensile loading of the steering attenuator.

In a further embodiment, the first sleeve may be configured to radially compress around the first drag link member to prevent relative movement therebetween, and the second sleeve may be configured to radially compress around the second drag link member to prevent relative movement therebetween.

In a further embodiment, the assembly may include first and second clamps positioned at opposing ends of the steering attenuator assembly configured to radially compress ends of the first and second sleeves around their respective first and second drag link members.

In a further embodiment, the first and second spring members may be one of compression springs and elastomeric members.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 1 is an isometric view of a drag link assembly according to an embodiment of the invention;

FIG. 2 is an isometric view of a prior art drag link assembly;

DETAILED DESCRIPTION OF THE INVENTION

Figure 3:
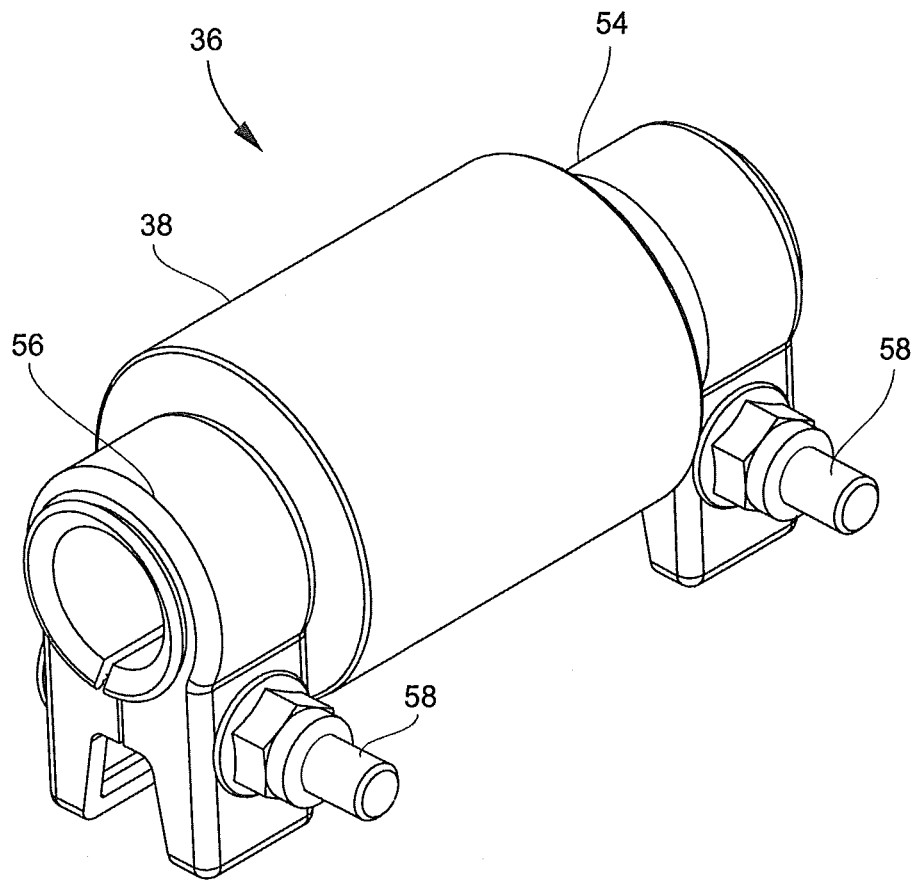
FIG. 3 is an isometric view of the steering attenuator assembly.
Figure 4:
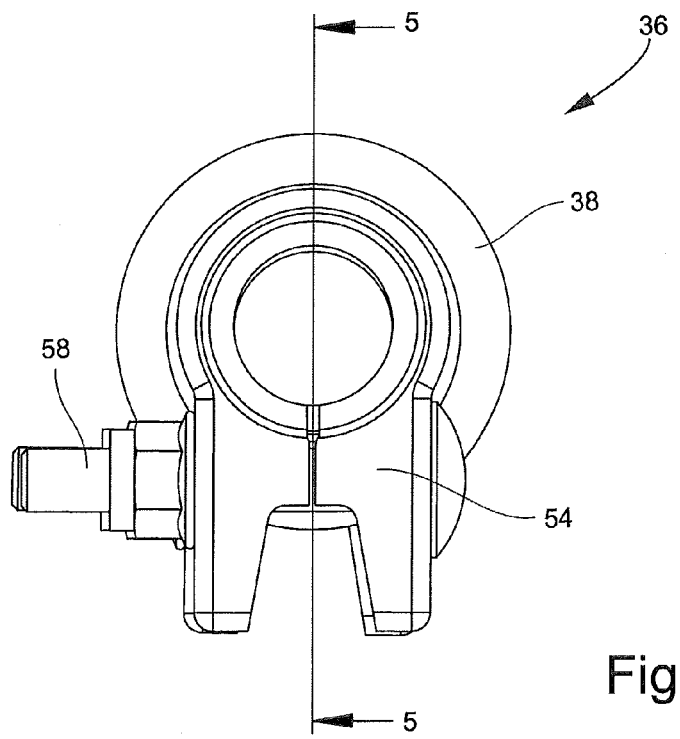
FIG. 4 is a front elevation view of the steering attenuator assembly.
Figure 5:
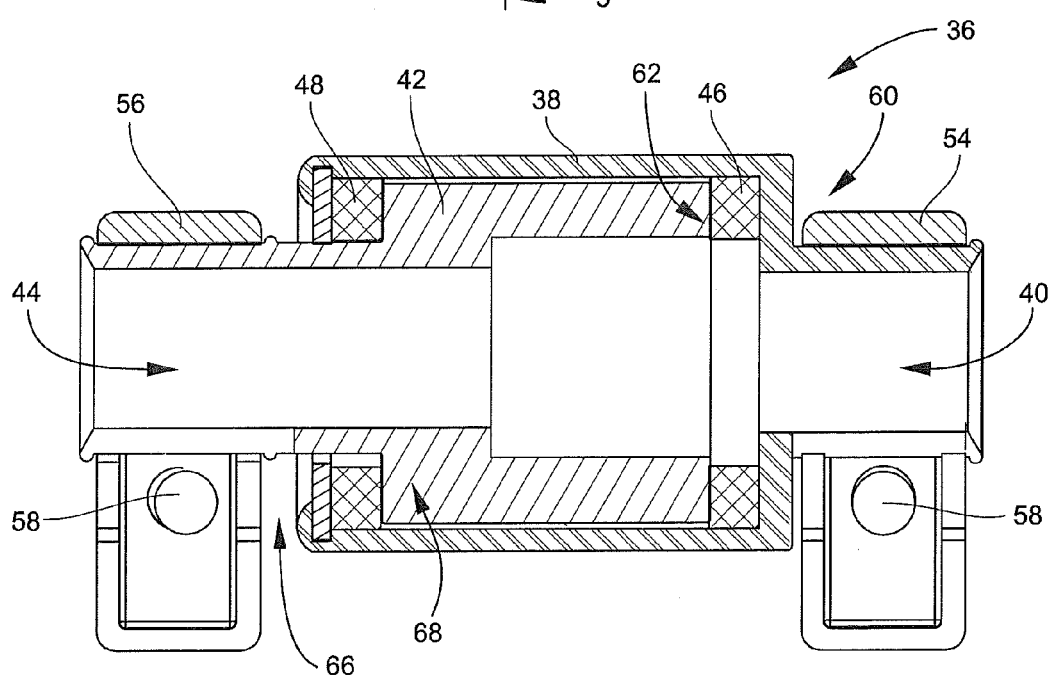
FIG. 5 is a sectional view of the steering attenuator assembly taken along line 5-5 of FIG. 4.
Figure 6:
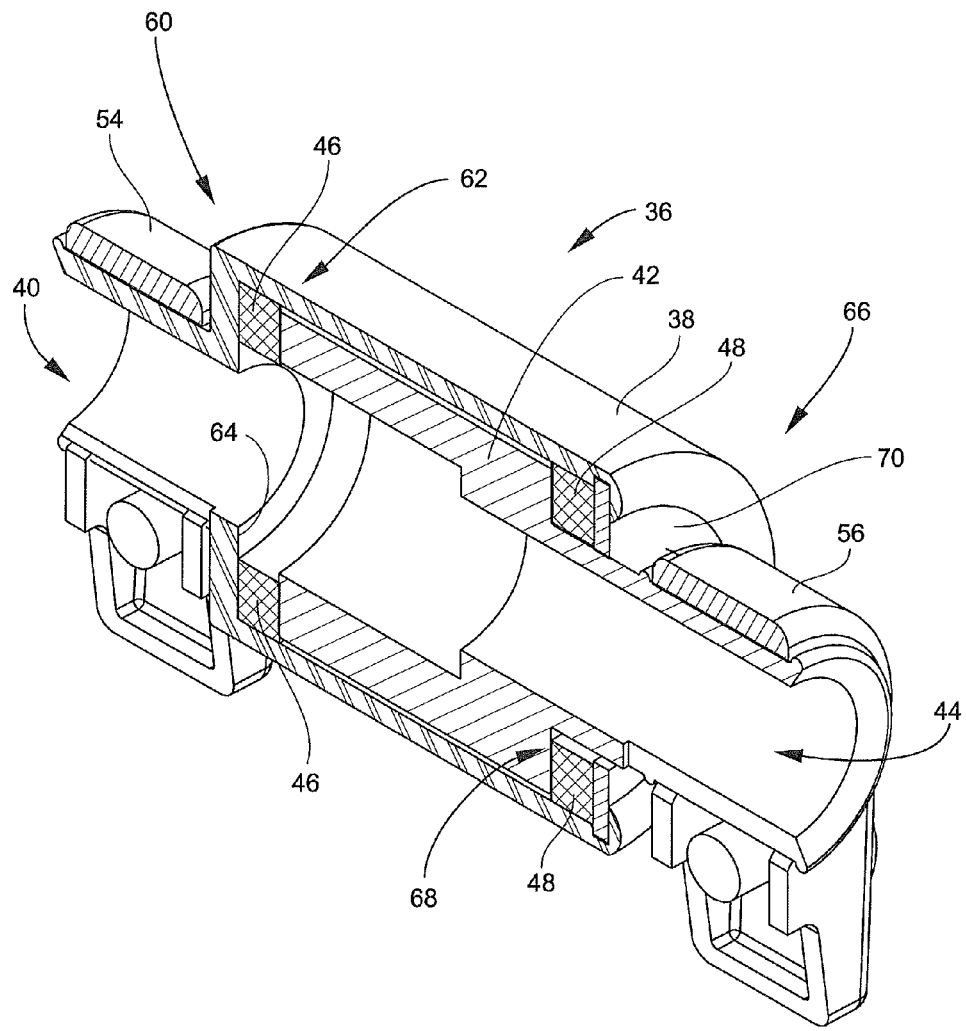
FIG. 6 is another sectional view of the steering attenuator assembly.
Figure 7:
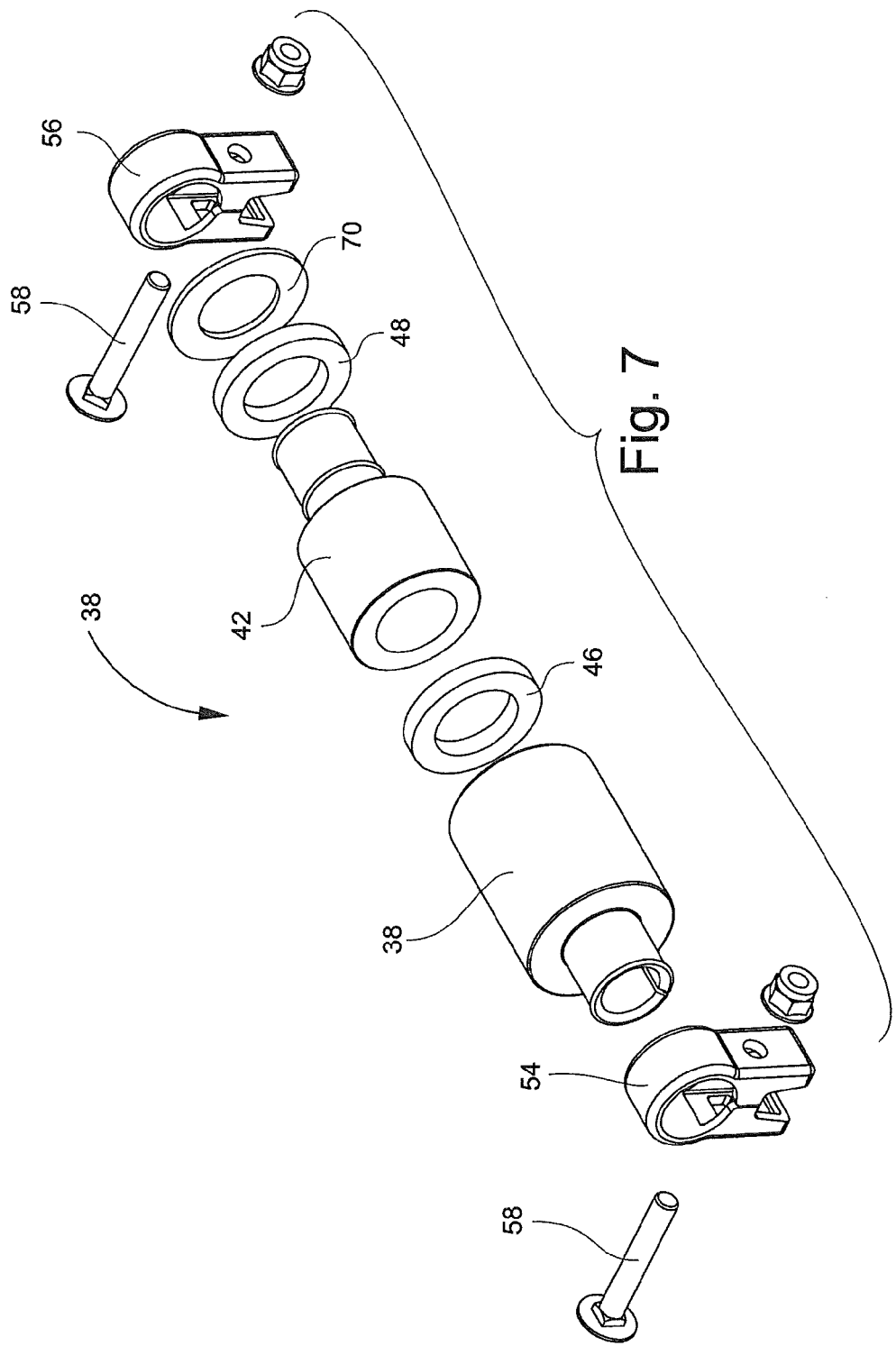
FIG. 7 is an exploded view of the steering attenuator assembly.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to FIG. 1, a drag link assembly according to an embodiment of the invention is shown generally at reference numeral 20. Known to those skilled in the art, the drag link assembly 20 is a component of the steering linkage of a motor vehicle. In one particular steering linkage arrangement, the drag link assembly 20 connects at one end to a pitman arm 22, and at the opposing end to a tie rod assembly (not shown). Drag link attachment points preferably include ball joints 24 for providing free kinematic motion.

FIG. 2 shows a prior art drag link assembly 26 including an adjuster sleeve 28 positioned along the length of the assembly. The adjuster sleeve 28 may include sets of internal threads for engaging external threads of first and second socket assemblies 30, 32. The socket assemblies 30, 32 can be advanced into or withdrawn from the adjuster sleeve 28 to adjust the length of the assembly. While this arrangement allows the length of the drag link assembly 26 to be adjusted prior to installation, the drag link assembly remains fixed in length after installation. Clamps 34 are tightened to secure the threads of the adjuster sleeve 28 relative to the threads of the first and second socket assemblies. In another embodiment, the first and second socket assemblies 30, 32 may lack threading and are otherwise fixed relative to the adjuster sleeve 28.

In comparison to the prior art drag link assembly 26 shown in FIG. 2, the drag link assembly 20 shown in FIG. 1 substitutes a dynamic steering attenuator assembly 36 in place of the conventional adjuster sleeve 28. The drag link assembly 20 may be assembled and provided as a complete unit including the steering attenuator assembly 36 for original equipment and retrofit applications. In other applications, the steering attenuator assembly 36 may be provided as a stand-alone unit to be installed on an existing drag link assembly. In yet another application, the drag link assembly 20 may be included as a part of a complete steering linkage assembly. As apparent by comparing FIGS. 1 and 2, the steering attenuator assembly 36 has a length substantially equal to the length of the conventional adjuster sleeve 28, but a slightly greater diameter. The steering attenuator assembly 36 is thus packaged and dimensioned to fit within the confines of space allocated to the steering linkage in a motor vehicle.

Referring to FIGS. 3-7, the steering attenuator assembly 36 generally includes a first sleeve 38 defining an axial passage 40 therethrough, a second sleeve 42 defining an axial passage 44 therethrough, and first and second annular spring members 46, 48 fitted internal to the assembly, the first spring member 46 arranged to compress under compressive loading of the assembly and the second spring member 48 arranged to compress under tensile loading of the assembly. The second sleeve 42 has a lesser length and diameter than the first sleeve 38 so as to fit within the axial passage 40 of the first sleeve. The second sleeve 42 is engaged within the first sleeve 38 and movable relative thereto in an axial direction. Specifically, the first and second sleeves 38, 42 are arranged for translational motion in the axial direction under compressive and tensile loading.

One end of each of the first and second sleeves 38, 42 is configured to receive and retain a respective portion of the drag link members, with a first drag link member 50 is adapted to engage a tie rod assembly and a second drag link member 52 is connected to the pitman arm 22 (see FIG. 1). In a particular embodiment, ends of the first and second sleeves 38, 42 are C-shaped and radially compressible to radially compress around an end of the first and second drag link members 50, 52 engaged therein to prevent relative movement therebetween. The assembly 36 is thus positioned in series between the drag link members. First and second clamps 54, 56 mount over opposing ends of the assembly 36 and tighten around the sleeves to secure the drag link members 50, 52 to the assembly 20. The first and second clamps 54, 56 may be tightened, for example, by tightening a nut and bolt 58 arranged through the ends of the clamps.

The first and second sleeves 38, 42 may each define a continuous axial passage thererough or may define interrupted passages for the drag link retaining and sleeve engaging portions.

The first spring member 46 is captured between a first end 60 of the first sleeve 38 and a first end 62 of the second sleeve 42. The first spring member 46 seats against an internal collar 64 within the passage of the first sleeve 38 and is compressed between the collar 64 and the first end 62 of the second sleeve when the assembly 36 is axially compressed, i.e., the assembly shortens. The second spring member 48 is captured between a second end 66 of the first sleeve 38 and a second end 68 of the second sleeve 42. The second spring member 48 seats against the inner surface of an annular end wall 70 secured to the first sleeve 38 subsequent to first and second sleeve engagement. The second spring member 48 is compressed when the assembly 36 undergoes tensile loading, i.e., lengthens.

The term "spring member" as used herein includes compression springs, elastomers and like springs. Known to those skilled in the art, compression springs operate with a compression load and elastomers can be deflected to large deformation and can be molded to fit the space between the sleeves. The first and second spring members 46, 48 can have the same spring rate or different spring rates. The spring rates of the first and second springs 46, 48 can be selected based on the desired damping and steering response, wherein steering response is defined as the differential of steering wheel angular travel to outside road wheel angular travel $\delta_{SW}/\delta_{RW}$.

Figure 8:
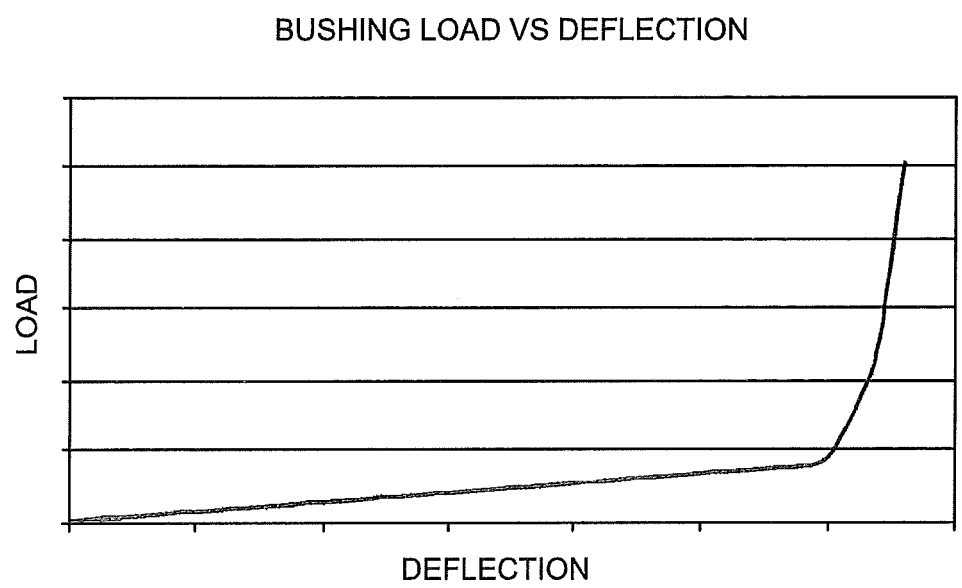
FIG. 8 is a graph illustrating an exemplary load-deflection curve of the steering attenuator assembly.
Figure 9:
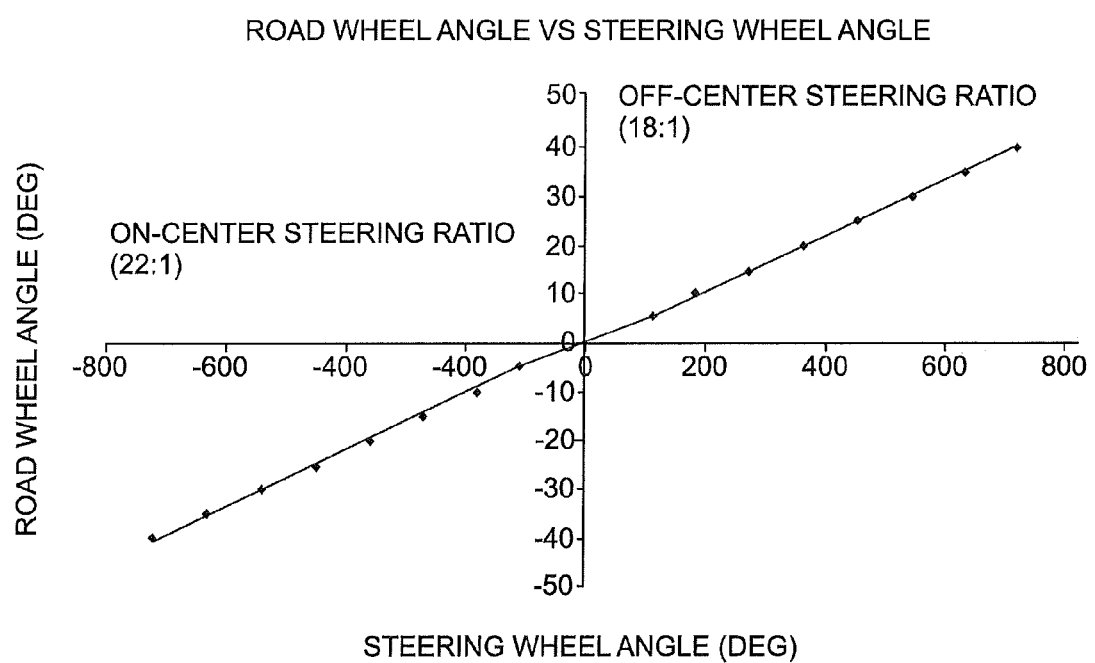
FIG. 9 is a graph illustrating an exemplary steering response curve of the steering attenuator.

By tuning the spring rate of the steering attenuator assembly 36, the steering response can be varied. In other words, by tuning the amount of axial compression within the spring pocket, the dwell time of the response can be altered. In a vehicle prone to oversteer at highway speeds, it may be desirable to reduce the steering response in the on-center area of a steering response curve. An example of an achievable load-deflection curve of the steering attenuator assembly 36 is illustrated in FIG. 8. An example of an achievable steering response curve of the steering attenuator assembly 36 is illustrated in FIG. 9, illustrating lag or play in the on-center area of the steering response curve. In comparison to the steering response curve shown in FIG. 9, the steering ratio in a rigid system (i.e., without the steering attenuator assembly 36) is constant.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A steering attenuator assembly, comprising:
    a first sleeve defining an axial passage;
    a second sleeve defining an axial passage, the second sleeve engaged within the first sleeve and movable relative thereto in an axial direction; and
    first and second spring members fitted internal to the steering attenuator assembly, the first spring member arranged between the first and second sleeves to compress under compressive loading of the steering attenuator assembly and the second spring member arranged between the first and second sleeves to compress under tensile loading of the steering attenuator assembly; and
    wherein each of the first and second sleeves is configured to receive and retain a drag link member therein.

2. The steering attenuator assembly of claim 1, wherein the first and second sleeves are axially aligned, the first spring member is captured between a first end of the first sleeve and a first end of the second sleeve, and the second spring member is captured between a second end of the first sleeve and a second end of the second sleeve.

3. The steering attenuator assembly of claim 1, wherein the second sleeve has a lesser diameter and length than the first sleeve such that the second sleeve is received within the first sleeve and movable relative thereto in the axial direction.

4. The steering attenuator assembly of claim 1, wherein one end of each of the first and second sleeves is configured to radially compress around the drag link member received therein to prevent relative movement therebetween.

5. The steering attenuator assembly of claim 1, further comprising first and second clamps positioned at opposing ends of the steering attenuator assembly configured to be tightened to radially compress the opposing ends of the steering attenuator assembly to retain the drag link members engaged therein.

6. The steering attenuator assembly of claim 1, wherein the first and second spring members are compression springs having the same spring rate.

7. The steering attenuator assembly of claim 1, wherein the first and second spring members are compression springs having different spring rates.

8. The steering attenuator assembly of claim 1, wherein the first and second spring members are elastomeric members having the same spring rate.

9. The steering attenuator assembly of claim 1, wherein the first and second spring members are elastomeric members having different spring rates.

10. A steering attenuator assembly, comprising:
    a first sleeve defining an axial passage therethrough;
    a second sleeve defining an axial passage therethrough, the second sleeve engaged within the first sleeve and movable relative thereto in an axial direction;
    a first spring member located internal to the steering attenuator assembly and captured between a first end of the first sleeve and a first end of the second sleeve configured to compress under compressive loading of the steering attenuator;
    a second spring member located internal to the steering attenuator assembly and captured between a second end of the first sleeve and a second end of the second sleeve configured to compress under tensile loading of the steering attenuator; and
    first and second clamps positioned at opposing ends of the steering attenuator assembly configured to be tightened to radially compress around drag link members engaged therein.

11. The steering attenuator assembly of claim 10, wherein the first and second sleeves are configured to receive and retain the drag link members therein.

12. The steering attenuator assembly of claim 10, wherein the first and second spring members have the same spring rate.

13. The steering attenuator assembly of claim 10, wherein the first and second spring members have different spring rates.

14. A drag link assembly for motor vehicle steering linkage, comprising:
    a first drag link member configured for attachment to a tie rod by way of a ball joint;
    a second drag link member attached to a pitman arm by way of a ball joint; and
    a steering attenuator assembly connected in series between the first and second drag link members, the steering attenuator assembly comprising:
        a first sleeve defining an axial passage therethrough;
        a second sleeve defining an axial passage therethrough, the second sleeve engaged within the first sleeve and movable relative thereto in an axial direction; and
        first and second spring members fitted internal to the steering attenuator assembly, the first spring member arranged to compress under compressive loading of the steering attenuator assembly and the second spring member arranged to compress under tensile loading of the steering attenuator assembly.

15. The drag link assembly of claim 14, wherein the first spring member is captured between a first end of the first sleeve and a first end of the second sleeve, and the second spring member is captured between a second end of the first sleeve and a second end of the second sleeve.

16. The drag link assembly of claim 14, wherein the first sleeve is configured to radially compress around the first drag link member to prevent relative movement therebetween, and the second sleeve is configured to radially compress around the second drag link member to prevent relative movement therebetween.

17. The drag link assembly of claim 14, wherein the first and second spring members have the same spring rate.

18. The drag link assembly of claim 14, wherein the first and second spring members have different spring rates.

19. The drag link assembly of claim 14, wherein the first and second spring members are one of compression springs and elastomeric members.

* * * * *